W. A. THACHER.
PROCESS FOR TREATING ORES.
APPLICATION FILED OCT. 30, 1911. RENEWED FEB. 16, 1914.
1,119,473.
Patented Dec. 1, 1914.
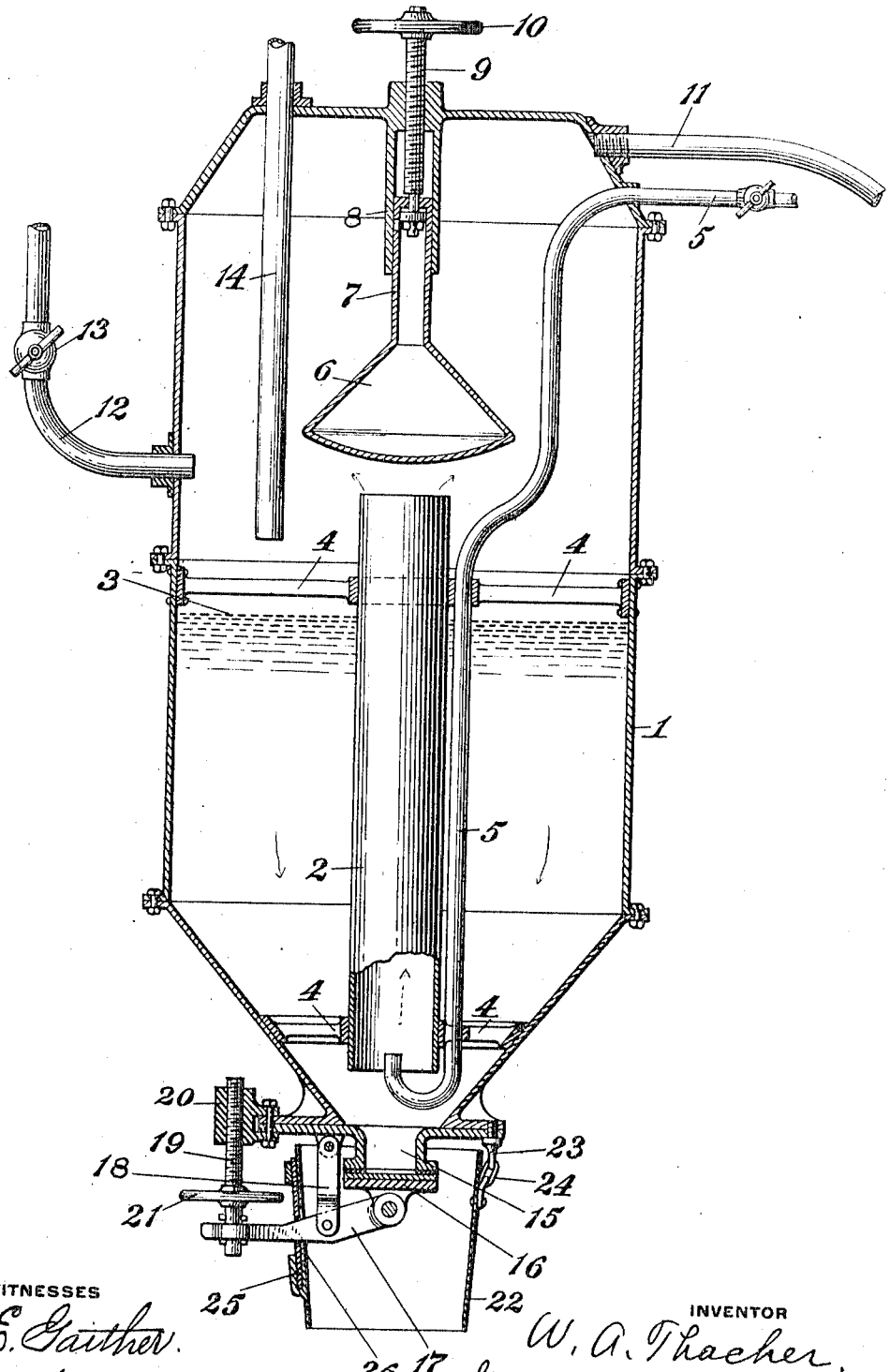

UNITED STATES PATENT OFFICE.

WILLIAM A. THACHER, OF LAKE CITY, COLORADO, ASSIGNOR TO THE ACID PROCESS COMPANY, A CORPORATION OF ARIZONA.

PROCESS FOR TREATING ORES.

1,119,473.

Specification of Letters Patent.

Patented Dec. 1, 1914.

Application filed October 30, 1911, Serial No. 657,412. Renewed February 16, 1914. Serial No. 819,068.

*To all whom it may concern:*

Be it known that I, WILLIAM A. THACHER, a citizen of the United States, residing at Lake City, in the county of Hinsdale and State of Colorado, have invented new and useful Improvements in Processes for Treating Ores, of which the following is a specification.

My invention relates to ore-digesters, and has particular reference to the treatment of sulfid ores of gold, silver, lead, etc., with one or more acids, but I do not limit it to any specific use.

It is the object of my invention to provide a process which will effect an intimate mixture of compressed air with the ore and the acid in the digester, and to cause a large portion of the acid fumes in the digester to be absorbed, condensed or combined, and directly returned to the digesting sludge or charge in the digester, thereby saving a much larger quantity of acid than is possible with any digester known to me.

Referring to the accompanying sheet of drawing, the figure shows a central vertical section of an ore-digester constructed in accordance with the principles of my invention, some of the parts being shown in elevation.

The digester comprises the shell or body 1, and certain mixing apparatus and other adjuncts presently to be described. The shell 1 may be composed of cast or wrought iron or other material lined with any substance with which the acids will not chemically combine.

2 designates a vertical non-corrosive open-ended tube preferably composed of aluminum. It is arranged centrally of the shell with its lower end a short distance above the bottom of the shell and its upper end a short distance above the selected level, as 3, of the charge of ore and acid. The tube 2 may be held vertical in various ways, the arms 4 suggesting one way.

5 is a valved pipe, preferably composed of aluminum, which leads compressed air from the exterior of the shell to the bottom of the tube 2, where it is arranged to discharge a stream of air vertically up the tube.

6 is the non-corrosive spreader or baffle arranged directly over the upper end of the tube 2. The vertical center line of the baffle coincides with the extension of the center or axial line of the tube 2. The baffle has a cylindrical upper end 7 slidable in the socket or holder 8 attached to the upper end of the shell. To the upper end 7 of the baffle I connect the swivel screw 9 which is threaded in the upper wall of the shell and is provided with the actuating hand-wheel 10. The lower end of the baffle is convex.

11 is the off-take pipe for the acid fumes or gases, and should, in accordance with the present practice, convey the fumes or gases to a series of absorption towers, in which the gases are combined with water to form liquid or free nitric acid to be re-used in the digester. As the recovery of the acid fumes in these towers and their return to the digester are old, I have not deemed it necessary to encumber the drawings to show the absorption towers and other adjunctive apparatus. 12 designates the pipe by which the acids may be charged into the digester, 13 being a valve for the pipe.

The ore is charged into the shell through the pipe 14 extending through the top thereof below the level of the top of the pipe 2, the pipe 14 being supplied from an air-tight ore-holder (not shown). The pipe 14 delivers ore below the level of the pipe 2 in order that the fine particles of the ore may be wet with the falling spray and not be carried out through the off-take pipe 11.

The lower end of the shell tapers downwardly so that the charge therein may flow to the central discharge opening 15, which is closed by the door or cover 16 having the lever 17 pivotally connected at one end to its lower side. The lever 17 is fulcrumed to the links 18 (only one shown), which are pivotally secured to a fixed support. The remaining end of the lever supports the rotary screw 19 which works in the fixed nut 20.

21 is a hand-wheel for rotating the screw. The drawing shows the discharge opening closed by the door 16. By rotating the screw 19 in the proper direction, the outer end of the lever 17 will travel upwardly and the inner end downwardly, permitting the material in the digester to escape through the opening 15. The funnel 22 is arranged to surround the door 16 and the discharge opening 15 so as to intercept the sludgy digested material escaping laterally and direct it downwardly in a single contracted stream for further treatment. The funnel may have one side removably connected to the fixed hook 23 by means of the loop 24 on the funnel.

25 is a slide-door on the funnel to close the slot 26, which accommodates the lever 17.

The operation of my improved ore-digester is as follows: The door 16 being closed, the valve 13 is opened whereupon a measured charge of acid flows through the pipe 12 into the digester. The valve is then closed. A measured charge of finely ground ore is fed gradually into the digester through the pipe 14. The valve in the pipe 5 is opened and a supply of compressed air passes through the pipe 5 and up the tube 2 pushing the re-acting acid and ore rapidly up the tube 2 and into contact with the convex bottom of the baffle 6, by which it is caused to spread out in a dense spray reaching the side of the shell. Acid fumes constantly rise from the sludgy or re-acting material in the shell and are intercepted by the said spray, whereby a large proportion of the acid fumes or gases are condensed, or combined with other elements to form free acid which falls back to mingle with the charge in the digester and assist in the digestive process. The operation of my digester under considerable pressure appears to be important in the working of my process, the pressure reaching about 40 pounds per square inch, depending on the rate of feeding the ore.

In practice the volume of the material going up the tube 2, having a diameter of one foot, is very large, thereby causing a violent agitation to bring all particles of ore into contact with the acid or acids of the charge and a rapid violent expansion of the material at the top of the tube 2. The material strikes the baffle with great force causing it to be still further broken up into spray which extends entirely across the shell. The air entering through the pipe 5 leaves the shell by way of the off-take pipe 11 charged heavily with nitric acid fumes which are recovered in a well-known manner in a series of absorption towers, not necessary to be described or illustrated.

When the digestion of the ore is nearly completed the baffle 6 is raised by the operation of the screw and the air pressure reduced in the pipe 5 by operating the valve shown therewith, or otherwise. The raising of the baffle and the reducing of the air pressure prevent the formation of the spray and permit the last formed gases to rise unobstructed and pass out the pipe 11.

I do not limit myself to any definite proportions of ore and acids, or to the proportion of the acids used. In all cases nitric acid is used with sulfid ores. Other acids, such as sulfuric and hydrochloric acids, are used according to the nature of the ore. By my process and apparatus I am enabled to reduce the quantity of nitric acid per charge from one-fourth to one-half of the amount ordinarily required, the other elements of the charge remaining as under the present practice.

While I do not desire to limit myself to the degree of pressure in the digester nor to definite proportions of ingredients, I have found the following to be satisfactory. I use about 75 pounds of nitric acid, corresponding to the reading 14.2° on Beaume's hydrometer, for each per cent. of sulfur in the ore; that is, if the ore shows 10% sulfur, I use about 10×75 pounds of nitric acid. If there are other impurities in the ore beside sulfur, sulfuric acid, hydrochloric acid, etc. will be used according to well-known rules, the amounts and kinds of acid depending on the constitution of the ore.

I do not desire to be limited to the precise details and combinations shown and described as many changes may be made without departing from the spirit and scope of the appended claims.

I claim—

1. The process of treating sulfid ores which consists in causing a stream of compressed air to pass through a charge of ore and acid in a closed vessel and causing a spray of the charge to be spread across the surface of the charge in the path of the acid fumes and gases rising from the charge.

2. The process of treating sulfid ores which consists in mixing the ore with re-acting acid in a vessel, agitating the same vigorously during their reaction, and causing a portion of the acid fumes to be intercepted and recovered in the vessel by a spray, the whole being performed under a pressure greater than normal atmospheric pressure.

3. The process of treating sulfid ores which consists in causing a stream of compressed air to pass through a charge of ore and acid in a closed vessel, causing a spray of the charge to be spread across the surface of the charge in the path of the acid fumes and gases rising from the charge, and collecting in an absorbing liquid the acid gases which pass beyond the spray.

Signed at Pittsburgh, Pa., this 27th day of October, 1911.

WILLIAM A. THACHER.

Witnesses:
ALICE E. DUFF,
F. N. BARBER.